3,180,632
COATED CRUCIBLE AND CRUCIBLE AND MOLD COATING METHOD
Norman H. Katz, Northridge, and Ernest G. Kendall, Woodland Hills, Calif., assignors to North American Aviation, Inc.
No Drawing. Filed Oct. 2, 1961, Ser. No. 142,024
12 Claims. (Cl. 263—48)

Our invention relates to a crucible coating, and more particularly to coatings for graphite crucibles and molds which lengthen their life and permit the melting and casting of refractory metals with negligible carbon contamination.

Induction melting and casting of refractory metals, such as titanium and zirconium, and the nuclear metals uranium and thorium, as a means of obtaining high purity material, is inherently lower in cost than present vacuum consumable arc-melting methods. Vacuum induction melting and casting of such metals in graphite crucibles and molds has not been used, however, because of carbon contamination. Excessive carbon adversely affects the ductility and impact properties of such metals. Further, the life of the unprotected graphite crucibles and molds has been limited to only several heats.

The consumable electrode process uses water-jacketed copper crucibles, and hence no carbon contamination is possible, although copper contamination does occur. The consumable electrode is composed of sponge metal or small quantities of selected scrap, plus sponge. However, chunk scrap cannot be used in large quantities because it tends to weaken the electrode and can cause breakage during the melting operation, and this further adds to the cost. In non-consumable electrode melting contamination occurs from the electrode (tungsten or graphite) and the container. Thus, vacuum induction melting and casting of refractory metals has economic promise providing carbon contamination can be minimized.

Therefore, an object of our invention is to provide a protective coating for a casting member.

Another object is to provide a coating for a graphite crucible wherein refractory metals can be melted with minimum carbon contamination.

Another object is to provide a method for vacuum induction melting and casting of refractory metals from low cost chunk scrap.

Another object is to provide a vacuum induction melting method for producing sound castings from titanium and zirconium scrap.

Another object is to provide a method for lengthening the life of crucibles and molds by means of a protective coating.

Other objects and advantages of our invention will become apparent from the following detailed description.

In accordance with our present invention we have provided an improved graphite foundry article, which comprises a crucible coated on its inner surfaces with a rare earth oxide. We have found that such rare earth oxide-coated crucibles and molds are extremely stable, protect and extend the life of the component through a large number of heats, and minimize carbon contamination of refractory metal castings.

The use of our rare earth oxide-coated crucibles or casting molds in vacuum induction melting and casting equipment produces sound commercial castings of finer grain size from refractory metal scrap, particularly of zirconium and titanium and their alloys, with resulting substantial economies over consumable electrode arc-melting processes. Carbon contamination is negligible, and the life of the graphite crucibles and molds is considerably extended. Also, the vacuum induction castings are found to be more homogeneous than with arc-melting due to more intimate contact between lower and higher melting constituents, and the stirring action of the electromagnetic field.

We find that the rare earth oxide admirably protects the graphite article and minimizes carbon pickup by the refractory metals to the point that ductility and impact properties are not adversely affected, and overall sound, high quality castings are obtained. As used in this specification and in the appended claims, the term "rare earth oxide" is intended to include yttrium oxide, and "casting article" or "crucible" is intended to include crucibles, molds, and other equipment employed in melting, handling, and casting of molten refractory metals. Also, as used herein, the term "refractory metal" is intended to embrace metals having melting points above about 1700° F. where steels fall off in usage, and includes zirconium and its alloys, titanium and its alloys including ferrous alloys, the nuclear metals uranium and thorium, and alloys thereof such as uranium-molybdenum, uranium-niobium, and uranium-molybdenum-aluminum.

Particularly satisfactory rare earth oxides are those of the lanthanide series such as lanthanum, gadolinium, and cerium, while the single preferred oxide is yttria. When the nuclear metals, and zirconium which is widely used in nuclear reactors as a structural metal, are employed, the rare earth oxide mold wash employed should be of relatively low thermal neutron absorption cross section to avoid contamination of the casting with neutron poisons and, for this purpose also, yttria is preferred due to its low cross section (approximately 1.4 barns). Since the rare earth oxides are relatively expensive, for many applications we find that they may be satisfactorily diluted with up to about 85 wt. percent zirconia.

The surfaces of the components which normally come in contact with molten metal are first cleaned with a solvent and/or abrasive, and then coated with the rare earth oxide. The oxide is finely comminuted, the major fraction being of mesh size of about −325 mesh, but may range from +100 to −325 mesh. The finely divided oxide is then suspended in an aqueous or organic suspension, and applied to the inside of the graphite article by conventional means, such as brushing, which insures that a continuous coating is retained on all surfaces. Flame-spraying of dry oxide powder is also satisfactorily used. Following application, the coating is allowed to air-dry, and then is further dried at an elevated temperature to remove any residual solvent. The process may be repeated to obtain a coating of the desired thickness.

The rare earth oxide is applied onto the surface of the graphite component in a carrier medium which comprises a binder in a solvent. The choice of the carrier medium is inherently very broad, and it is unnecessary to employ any particular composition for the satisfactory practice of our invention. Thus, both inorganic and organic binders and solvents, both synthetic and natural, may be employed. An inorganic carrier medium is typically an alkali metal silicate, such as sodium silicate, in water solution. Natural gums, such as arabic and tragacanth in an aqueous solution may be suitably employed. The common, conventional resins such as polyvinyl, polyacrylic ester, cellulose polymer, polyester, phenol-formaldehyde and silicone resins are highly satisfactory binders. The acrylic ester resins are typically represented by the common polymethyl and polyethyl methacrylate; and the vinyl resins by the vinyl acetate resins. Particularly good results have been obtained with the acrylic lacquers.

The choice of solvents is similarly wide, and generally the known solvents for the binders may be used. For example, the cellulosic polymers, such as methyl cellulose, may be dissolved in water at about 80–95° C. The silicone resins, such as ethyl silicate, may be dissolved in relatively low molecular weight aliphatic organic solvents such as ketones (methylethyl ketone, acetone, ethyl ketone, diethyl ketone), and alcohols (ethanol, methanol, propanol, isopropanol), or water mixtures of such solvents. Other cellulosic polymers, typically represented by cellulose acetate and methyl cellulose, may be dissolved in the foregoing organic solvents, and also ester solvents such as Cellosolve acetate and ethyl acetate. In addition to the aliphatic solvents listed, the common aromatic solvents such as benzene, toluene, xylene, and their derivatives may also be satisfactorily used. The amount of solvent used varies with the particular binder, and generally only sufficient solvent to make the compositon sufficiently fluid for easy application by the selected means need be employed. For example, with the acrylic lacquer only about 10 wt. percent solvent is necessary.

The amount of rare earth oxide added to the carrier medium may satisfactorily vary over a wide range. The considerations here are the thickness of protective coating desired; this is generally in the range of about 0.005–0.015 inch, depending in large measure on the melting point of the refractory metal to be cast. The nature of the carrier medium is another factor; since the carrier medium must be later driven off, it is desirable to add as much oxide to the medium as will result in a homogeneous stable composition which is easily applicable. We find that about 25–75 wt. percent of oxide powder in the carrier medium mixture is generally satisfactory, while about 50 wt. percent is particularly satisfactory. The components are thoroughly mixed either manually or preferably with the aid of an electric stirrer until a homogeneous composition is obtained.

The coating mixture may be applied onto the article by conventional means, such as brushing, dipping, spraying, or electroferritic deposition. The oxide may also be applied, without a carrier medium, by flame-spraying. The mesh size of the oxide most suitable for flame-spraying is found to be about −200 to +325 mesh. The coatings are generally applied onto crucibles and molds made of graphite, graphite being in most widespread usage. However, our coating may be satisfactorily used on other materials, particularly on other mold materials. Satisfactory examples of other molds are those of copper, which may be water-cooled, cast iron, and zircon sand. The graphite molds may be of the shell mold type, which are destroyed by a single casting, and of the more permanent type machined from graphite.

After the coating composition is applied to the inside walls and bottom of the crucibles and molds, which come in contact with molten metal, it is permitted to air-dry, usually a period of about ½–1½ hours being required. It is then dried with a heat lamp or in an oven in order to remove any residual aqueous or organic solvent, this step being performed at a temperature in the region of about 250–300° F. for about ½–1½ hours. The binder, typically the synthetic resin type, is next removed by heating at a higher decomposition temperature characteristic of the particular resin. This is generally at a temperature in the neighborhood of 400–700° F., and such decomposition may be performed directly after the drying step, or at the same time as the refractory metal charge is melted. For example, since the refractory metals generally melt at a temperature far higher than that required to decompose the resin binder, for example at a temperature of about 1850° C. for zirconium, the binder would be decomposed before the charge in the crucible even begins to melt, and therefore no carbon contamination of the charge with decomposed binder results. Upon decomposition of the binder, the rare earth oxide forms a smooth, continuous and protective coating for the mold surface. At elevated temperatures, starting at about 1000° C., the oxide sinters producing a continuous, smooth, vitreous coating.

The following examples are offered to illustrate our invention in greater detail.

*Example I*

An acrylic lacquer carrier medium is prepared by first homogeneously mixing polymethyl methacrylate and methyl ethyl ketone in a 90 wt. percent lacquer-10 wt. percent solvent ratio. An equal weight (50 wt. percent of $Y_2O_3$ powder (−325 mesh) is added to the mixture. The components are thoroughly mixed with the aid of an electric stirrer. The mixture is applied by brushing on the interior surfaces of a graphite crucible and a graphite mold. The mold is shaped for a valve body casting. After application of the coating, the crucible and mold are permitted to air-dry, for a period of about 1 hour, and then are further dried by means of a heat lamp at 250–300° F., for about 1 hour, which removes any residual solvent. A coating of approximately 0.010 inch thick is obtained.

A zirconium alloy known as Zircaloy-2 (about 1.5 wt. percent tin being the principal alloy constituent, U.S. Patent 2,772,964), in the form of scrap from machine turnings, is carefully placed in the crucible so as not to disturb the continuity of the coating. The furnace is evacuated to a pressure of about 100–150 microns (Hg) at the ambient room temperature. The charge is then heated to a temperature of about 1200° C. at a rate of 60° C. per minute. At 1200° C. the charge is allowed to out-gas until an equilibrium vacuum less than about 100 microns mercury is obtained. The charge is then heated to the desired pouring temperature of about 1775–1850° C. The molten alloy is bottom poured into the graphite molds precoated with yttria in the method described above with respect to the crucible.

The resulting casting is of excellent surface condition, essentially free of casting defects, having good ductility, and capable of being subsequently fabricated or used in the as-cast condition. Carbon content of the casting is limited to a few hundred parts per million at casting temperatures exceeding 1800° C., and to a completely negligible amount at temperatures below 1800° C.

*Example II*

The same as Example I except that a titanium-base alloy containing 6 wt. percent aluminum and 4 wt. percent vanadium is used. The castings obtained are of similar high quality with minimum carbon contamination. There is no erosion or attack on the graphite crucible.

*Example III*

The same as Example I except that gadolinium oxide in a polymethyl methacrylate-acetone carrier medium is applied onto the crucible and mold surfaces in a 50–50 wt. percent ratio.

*Example IV*

A mold coating consisting of 85 wt. percent $ZrO_2$–15 wt. percent $Y_2O_3$ is suspended with stirring in a carrier medium comprising ethyl silicate resin in ethanol and supplied by brushing onto bottom-pour graphite crucibles and molds to a coating thickness of 0.015 inch. The coating is allowed to air-dry, and then is oven dried at 300° F. for 1 hour to remove residual moisture.

Melting and casting of thorium and thorium-uranium alloys is performed in the crucible and mold in a 100 kw. vacuum induction furnace. The average charge, which weighs 5 kg., is melted in the graphite crucible. The casting furnace is evacuated to about 100 microns (Hg) at room temperature. The charge is heated to 1400° C. at a rate of 50° C. per minute, with power input at approximately 35 kw. At 1400° C., the power input is reduced to 20 kw. and the charge allowed to out-gas until an equilibrium vacuum of less than 100 microns (Hg) is obtained. Power input is then increased to 40 kw. and the charge heated to the desired pouring temperature, between 1750–1850° C. The molten charge is allowed to remain in contact with the crucible from 4 to 12 minutes before being poured into the coated graphite molds. Pouring is achieved by lifting a graphite stopper rod away from the pour hole at the base of the crucible. The castings are sound internally and display no appreciable centerline shrinkage. There is verturally no degree of attack on the graphite crucible and carbon contamination of the product is minimal.

*Example V*

The same as Example I except that lanthanum oxide in a carrier medium of ethyl cellulose in toluene is applied as a protective coating on the crucible and mold. The quality of the casting is good, carbon pickup minimum, and no detectable erosion of the crucible is observed.

*Example VI*

The same as Example I except that cerium oxide in a polyvinyl acetate-toluene carrier medium is applied on the crucible surfaces. Satisfactory results are likewise obtained.

The above examples are illustrative rather than restrictive of our invention. Our invention should be understood to be limited only as indicated in the appended claims.

We claim:
1. An improved coated graphite crucible for the melting of refractory metals which is substantially non-contaminating thereto comprising a crucible base portion of graphite and a smooth, continuous sintered coating of a rare earth oxide on the interior surface of the crucible.
2. The crucible of claim 1 wherein the rare earth oxide is yttria.
3. A method of providing a crucible with a protective coating to form an improved coated crucible for the melting of refractory metals which comprises applying a coating of a rare earth oxide onto the interior surfaces of said crucible and then sintering the resulting coating at a temperature of at least 1000° C. to form a smooth, continuous sintered coating.
4. The method of claim 3 wherein said rare earth oxide is applied onto the crucible in a carrier medium comprising a binder and a solvent.
5. The method of claim 3 wherein said rare earth oxide is applied onto the crucible by flame-spraying
6. A method of applying a protective coating onto a graphite crucible to form an improved coated crucible for the melting of refractory metals, which comprises forming a carrier medium of a synthetic resin and a solvent, adding a rare earth oxide in comminuted form to said carrier medium, applying the resulting composition onto the interior surface of said graphite crucible, and then drying the resulting coating to form a smooth, continuous coating comprising at least 15% by weight of said rare earth oxide.
7. The method of claim 6 wherein said rare earth oxide is yttria.
8. A method of applying a protective coating onto a graphite crucible to form an improved coated crucible for the melting of refractory metals, which comprises forming a solution of a carrier medium comprising a resin binder selected from the group consisting of silicone, cellulose, and acrylic ester resins dissolved in a solvent, adding a rare earth oxide in comminuted form selected from the group consisting of yttria, gadolinium oxide, lanthanum oxide and cerium oxide to said solution, stirring the resulting composition to form a homogeneous suspension, applying said suspension onto the interior surfaces of said crucible, and then drying the resulting coating to form a smooth, continuous coating comprising at least 15% by weight of said rare earth oxide.
9. A method of applying a protective coating onto a graphite crucible to form an improved coated crucible for the melting of refractory metals, which comprises forming a carrier medium comprising an acrylic ester resin in an organic solvent, adding finely divided yttria to said medium, stirring the resulting composition to form a homogeneous suspension, applying said suspension to the interior surfaces of said graphite crucible, drying the resulting coating, and then heating the dried coating at an elevated temperature to decompose the carrier medium and sinter the yttria to form a smooth, continuous sintered coating.
10. The method of claim 9 wherein the acrylic ester resin is dissolved in a ketone solvent, and approximately 50 wt. percent yttria is added to the carrier medium.
11. A method of melting and casting a refractory metal selected from the group consisting of zirconium, titanium, uranium, and thorium, which comprises providing a graphite crucible and a graphite mold, applying onto the interior surfaces of said crucible and said mold a coating comprising a suspension of finely divided yttria in a carrier medium comprising an acrylic ester resin in a solvent, drying the resulting coated crucible and mold to form a coating comprising at least 15% by weight of said yttria, charging the crucible with said refractory metal, vacuum induction melting said metal in said crucible, and then pouring the resulting molten metal in said mold in vacuum to form a casting of the refractory metal.
12. An improved coated crucible for the melting of refractory metals which is substantially non-contaminating thereto comprising a crucible base portion of a material which is solid and stable at the melting temperature of the refractory metal, and a smooth, continuous coating comprising at least 15% by weight of a rare earth oxide on the interior surface of the crucible.

References Cited by the Examiner
UNITED STATES PATENTS

| | | | |
|---|---|---|---|
| 1,589,014 | 6/26 | Lee | 22—192 |
| 2,448,685 | 9/48 | Dimiter | 106—56 |
| 2,500,208 | 3/50 | Shea | 106—56 |
| 2,507,068 | 5/50 | Underwood | 22—192 |
| 2,766,032 | 10/56 | Meister | 263—48 |
| 2,847,741 | 8/58 | Meves et al. | 22—193 |
| 2,930,089 | 3/60 | Harold | 22—192 |
| 2,978,360 | 4/61 | Bradstreet et al. | 117—129 |
| 3,023,119 | 2/62 | Anderson et al. | 22—192 |
| 3,049,797 | 8/62 | Drummond | 117—107 |
| 3,115,414 | 12/63 | Lottridge et al. | 22—192 |

MICHAEL V. BRINDISI, *Primary Examiner.*

MARCUS U. LYONS, RAY K. WINDHAM, *Examiners.*